May 9, 1961

J. F. WALTON 2,983,831

BOOTSTRAP CIRCUITS

Filed Feb. 24, 1959

2 Sheets-Sheet 1

INVENTOR

JOHN F WALTON

BY Hurvitz & Rose

ATTORNEYS

May 9, 1961 J. F. WALTON 2,983,831

BOOTSTRAP CIRCUITS

Filed Feb. 24, 1959 2 Sheets-Sheet 2

INVENTOR

JOHN F. WALTON

BY Hurvitz & Rose

ATTORNEYS

United States Patent Office 2,983,831

Patented May 9, 1961

2,983,831

BOOTSTRAP CIRCUITS

John F. Walton, McLean, Va., assignor to Elcor, Inc., Falls Church, Va., a corporation of Virginia Filed Feb. 24, 1959, Ser. No. 795,070

9 Claims. (Cl. 307—88.5)

Figure 1:
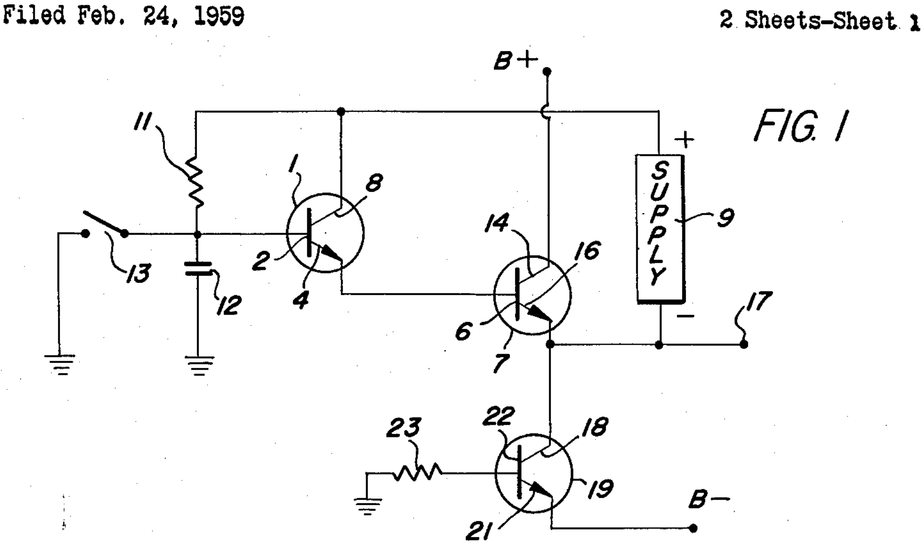

The present invention relates to bootstrap circuits and more particularly to inexpensive and simple bootstrap circuits utilizing floating, low capacitance power supplies.

The power supply utilized in the circuits of the present invention has a capacitance to ground of the order of magnitude of 20 micro-microfarads and is the subject of co-pending patent application Serial No. 683,740 filed by John F. Walton and John H. Reaves on September 13, 1957, Patent No. 2,914,719 and entitled Isolated Power Supply. The exceedingly low shunt capacitance of the power supply disclosed in the aforesaid application permits the power supply to be connected anywhere in an electronic circuit without producing, except in the very high frequency ranges, serious signal degradation due to shunting of circuit elements by the capacity of the supply.

The low shunt capacity power supply referred to above is especially useful in bootstrap circuits since it permits direct coupling, through the supply, of elements of two amplifiers in order to produce a bootstrap effect. The ability to effect direct coupling between elements in a bootstrap circuit permits the elimination of complex resistor and diode networks required in prior art circuits utilizing conventional power supplies. More specifically in prior art bootstrap circuits, feedback of signals from an element of one amplifying device, such as the cathode of a tube or the base of a transistor, to the plate or collector of a preceding amplifier stage required complex D.C. isolation circuits so that different D.C. voltages could be maintained on the various electrodes while permitting intercoupling of electrical signals. In the present invention the isolated power supply due to its low shunt capacity to ground, may be connected directly between the various electrodes of the circuit, in order to maintain the D.C. potential therebetween without seriously affecting the response time of the circuit.

In accordance with the present invention, reference being made initially to a transistorized modification of the circuit, two emitter-follower-connected transistors are connected in cascade with the emitter of the first transistor connected to the base of the second transistor. An emitter of the second transistor provides an output voltage and is connected through a low capacity isolated power supply to the collector electrode of the first transistor. The transistors being connected as emitter-followers each provides a relatively high input impedance and since the circuits are cascaded, the input impedance of the circuit is quite high. Further, due to the fact that the collector of the first transistor is connected through its power supply to the emitter of the second transistor the voltage on the collector follows the voltage applied to its base so that the base-collector voltage remains substantially constant and the input impedance of the circuit does not vary appreciably. Thus, the circuit provides a high input impedance which remains substantially constant.

In one embodiment of the present invention, the emitter of the second transistor is connected to a further transistor which is operated as a constant current device. In consequence, the second transistor is operated such that equal changes in base voltage, regardless of the D.C. level (within reason) of the voltage, produces equal changes in voltage at the emitter. The circuit thus provided is ideal as a saw-tooth sweep voltage generator and in a further embodiment of the invention a resistor may be connected between the collector and base of the first transistor and a capacitor connected between the base electrode and a source of reference potential such as ground. The capacitor as it charges raises the base voltage of the first transistor and due to the bootstrap effect the collector voltage and therefore the voltage at the end of the resistor remote from the capacitor is raised by an amount substantially equal to the rise in the base voltage and therefore the rise in the voltage across the capacitor. Consequently, the charging voltage applied across the series connected resistor and capacitor is maintained larger than the voltage across the capacitor by a fixed value and charging of the capacitor is linear. Also, since the input impedance of the first transistor is relatively large and is maintained substantially constant due to the bootstrap circuit, the transistor has substantially no effect upon the charging characteristic of the circuit and a substantially linearly rising output voltage is produced. An electronic switch may be connected across the capacitor to discharge it and therefore to produce fly back of the sawtooth voltage.

The circuit described above in which a constant current device is utilized is not wholly appropriate for driving a capacitive load, the constant current operation of the third transistor prevents rapid discharge of the capacitive load. In a second embodiment of the present invention, there is provided a sawtooth generator circuit in which a capacitive load can be rapidly discharged. In this circuit the bootstrap circuit is the same as described above but the transistor providing for constant current operation of the circuit is replaced by a variable current transistor which lowers the output impedance of the circuit and increases its current conduction during periods of discharge of a capacitive load so as to increase the discharge rate. In this embodiment of the invention, first and second transistors are again bootstrapped as described above, and the third transistor has its collector connected to the positive terminal of the power supply and its base connected to the collector of the second transistor. Variations in current flow of the second transistor affect the voltage applied to the base of the third transistor. Specifically, the third transistor is in shunt with the load and is maintained in a state of low conduction to charge the capacitive load. The third transistor on the other hand, being in shunt with the load, is in a state of high conduction during discharge of the capacitor. The circuit partakes of the nature of a push-pull circuit in which the third transistor does not unduly load the second transistor during charging of the capacitor and the second transistor does not unduly load the third transistor during discharge of the capacitor.

In a third embodiment of the invention, the transistors of the first aforementioned circuit are replaced by triodes and pentodes, where required, this teaching the interchangeability of tubes and transistors in the aforesaid circuits. Although the third embodiment relates to the conversion of the first circuit only, it teaches all that is required in order to convert the second transistor circuit to a tube circuit.

In each of the amplifiers discussed above, a negative feedback circuit may be employed to increase the linearity of the circuit. In a negative feedback amplifier, in effect, a portion of the output signal is subtracted from the input signal and the difference applied to the amplifier. If the input signal is replaced by a voltage standard then the D.C. amplifier discussed above becomes the output circuit of a voltage regulated anode supply. The negative feedback signal may be varied as by employing range switching, variable resistors, etc. and then the circuit becomes a voltage regulator which may be stabilized at different values of output voltage. Alternatively, the feedback signal may be varied automatically to produce a slowly or rapidly varying sawtooth voltage reasonably independent of loading.

The second embodiment of the invention is particularly useful as a voltage regulator circuit where a constant voltage is to be maintained across varying reactive loads, or stepped or sawtooth or ramp voltages are to be applied to reactive loads. Under these circumstances both rapid charging and discharging of the reactive load is required to maintain the voltage at its proper value. In the second embodiment of the invention the series transistor or tube provides rapid charging of the load while the shunt transistor or tube provides the requisite rapid discharging of the load or to maintain the system voltage when the load attempts to feed energy back into the power supply.

It is an object of the present invention to provide a bootstrap amplifier circuit having high input impedance, relatively low output impedance and utilizing a minimum number of power supplies and/or a minimum number of circuit components.

It is another object of the present invention to provide a bootstrap amplifier utilized to generate a sweep voltage in which the charging current applied to a capacitor in the sweep generating circuit is maintained constant over the operating range of the apparatus.

It is still another object of the present invention to provide a bootstrap amplifier circuit which may be utilized to generate a sawtooth sweep voltage that may be applied to a capacitive load.

It is another object of the present invention to provide a simple and inexpensive bootstrap amplifier circuit utilizing low capacitance power supplies which permit the elimination of complex intercoupling and signal and voltage isolation circuits.

Yet another object of the present invention is to provide a voltage regulator circuit employing a D.C. bootstrap amplifier.

Still another object of the present invention is to provide a voltage regulator circuit employing a bootstrap amplifier utilizing amplifier elements connected in series and in parallel with a reactive load element to effect rapid charge and discharge thereof.

Figure 2:
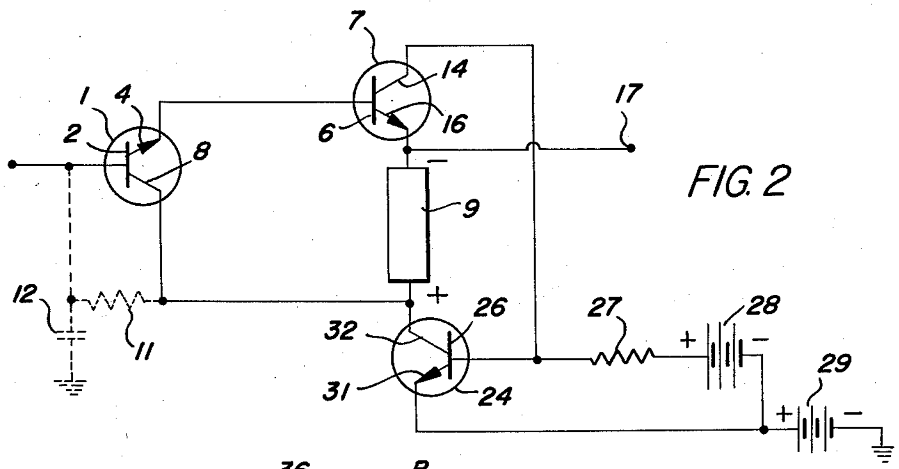
Figure 3:
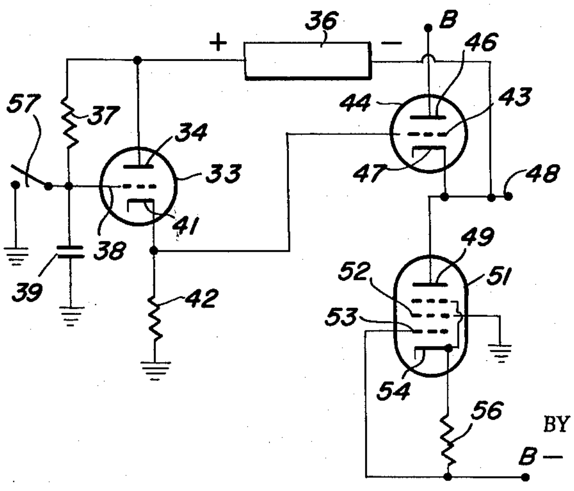
Figure 4:
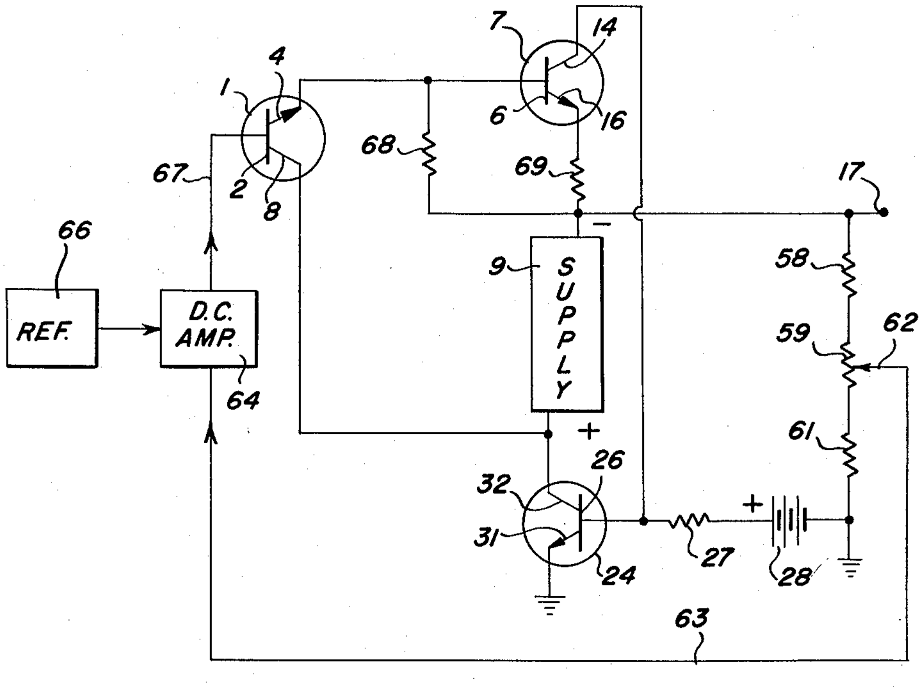

The above and still further objects, features and advantages of the present invention will become apparent upon consideration of the following detailed description of several embodiments thereof, especially when taken in conjunction with the accompanying drawings, wherein:

Figure 1 of the accompanying drawings is a schematic circuit diagram of a transistorized bootstrap amplifier employed to produce a sawtooth voltage;

Figure 2 of the accompanying drawings is a schematic diagram of a transistorized bootstrap amplifier employed to drive a capacitive load;

Figure 3 is a schematic circuit diagram of a tube circuit which is the equivalent of the transistor circuit of Figure 1; and Figure 4 is a schematic circuit diagram of a voltage regulator employing the basic circuit of Figure 2.

Referring specifically to Figure 1 of the accompanying drawings, there is illustrated a bootstrap sweep circuit as provided by the present invention. An NPN transistor 1 which is connected to an emitter follower, has a base electrode 2 connected to a junction 3, an emitter electrode 4 connected to a base electrode 6 of a second transistor 7 and a collector electrode 8 connected to the positive terminal of a low capacity power supply 9. The collector electrode 8 is further connected through a resistor 11 to the junction 3 and the junction 3 is connected via a capacitor 12 to a reference potential hereinafter referred to as ground for purposes of example only. The capacitor 12 is shunted by a normally open switch 13. The transistor 7 is provided with a collector electrode 14 connected to a source of positive potential and an emitter electrode 16 connected to the negative terminal of the power supply 9 and also connected to an output terminal 17. The emitter electrode 16 of the transistor 7 is further connected to a collector electrode 18, a transistor 19 having an emitter electrode 21 connected to the negative terminal of a source of voltage and a base electrode 22 connected through a resistor 23 to ground. The resistor 23 controls the base current of the transistor 19 in order to provide a constant base current so that the collector current of the transistor is also constant.

Temporarily discounting the operation of the resistor 11 and capacitor 12, upon the application of a positive pulse, to the base electrode 2, the emitter electrode 4 of the transistor 1 follows the base voltage and rises. This increase in voltage is applied to the base electrode 6 of the transistor 7 which is also connected as an emitter follower and therefore a positive voltage pulse appears at the output terminal 17. The positive voltage pulse appearing at the output terminal 17 is coupled through the power supply 9 to the collector electrode 8 of the transistor 1 to provide the bootstrap effect. In consequence of this connection, the collector electrode 8 and the base electrode 2 of the transistor 1 maintain a substantially constant voltage therebetween which maintains the input impedance of the circuit substantially constant. Further, the circuit provides a very high input impedance, this being a characteristic of emitter follower transistors which is enhanced in the present circuit by the cascading of two emitter-follower amplifiers. In consequence, the circuit provides a high input impedance which is maintained at a substantially constant value due to the bootstrap effect.

The circuit operates as a constant output current device as a result of the utilization of the transistor 19. The effect of the transistor 19 is to maintain the current through the emitter-follower amplifier 7 at a substantially constant value and causes the transistor 7 to operate over a portion of its characteristic curve having a nearly linear operating characteristic.

Referring now to the operation of the circuit as a sweep circuit, the switch 13 is initially closed to discharge the capacitor 12 and is then opened to permit a uniformly increasing voltage to be developed across the capacitor. Initially, the capacitor 12 begins to charge and in consequence raises the voltage to the base electrode 2 of the transistor 1. The bootstrap circuit operating through the transistor 7 raises the voltage at the collector 8 of the transistor 1 by an amount substantially equal to the rise in voltage at the base electrode and therefore the voltage at the upper end of the resistor 11, as viewed in Figure 1, is raised by almost the amount as the voltage at the lower end of the resistor. The voltage applied to the series circuit comprising resistor 11 and capacitor 12 rises by the same amount as the rise in the voltage across the capacitor 12 so that the differential in voltage between the tops of the capacitor 12 and the resistor 11 remains substantially constant. The voltage across the capacitor 12, therefore, increases uniformly at a rate depending upon the time constant of the circuit comprising resistor 11 and the capacitor 12 and the input impedance of transistor 1. The input impedance of the transistor 1 does not appreciably affect the circuit since its input impedance is quite high and is substantially constant. As previously indicated, rapid discharge of the capacitor 12 may be effected by the switch 13 which in a practical embodiment of the circuit would comprise an appropriate electronic switch.

The circuit of Figure 1 insures linear charging of a load applied to the output terminal 17 but where the load being supplied is capacitive, the constant current operation of the transistor 19 limits the discharge time of the capacitive load. Where it is essential that rapid discharge of a capacitive load be effected by the circuit, resort may be had to the circuit of Figure 2. In Figure 2, the bootstrap circuit including the transistors 1 and 7 is identical with that illustrated in Figure 1 and the corresponding elements in the two figures bear the same reference numerals. A basic change in the circuit occurs in the connection of the third transistor and in the circuit illustrated in Figure 2 a third transistor 24 has a base electrode 26 connected to the collector electrode 14 of the transistor 7 and through a resistor 27 to the positive terminal of a battery or other suitable voltage supply 28. The negative terminal of the supply 28 is connected to the positive terminal of a further battery or other suitable supply 29 and is also connected to an emitter electrode 31 of the transistor 24. The negative terminal of the supply 29 is connected to ground. The transistor 24 is further provided with a collector electrode 32 which is connected to the collector electrode 8 of the transistor 1 and is therefore also connected to the positive terminal of the supply 9.

The function of the transistor 24 in the circuit of Figure 2 is to lower the output impedance of and increase the gain of the circuit, reduce the discharge time of a capacitive load and provide a substantially constant voltage output in the circuit. In this latter respect the constant voltage output refers to maintaining a constant output voltage in response to a fixed input voltage, in spite of variations in the impedance of the output load connected between ground and the terminal 17.

The operation of the circuit in providing increased gain and rapid discharge of a capacitive load connected to the terminal 17 becomes apparent upon discussion of the operation of the circuit in response to first positive and then negative pulses. If a positive pulse is applied to the base electrode 2 of the transistor 1, the emitter electrode 4 goes positive as does the emitter electrode 16 of the transistor 7 since both transistors 1 and 7 are emitter followers. A rise in voltage on the base electrode of the transistor 7 produces increase in its collector current which current may be employed to charge a capacitive load connected to terminal 17. The rise in collector current causes the collector voltage to fall as a result of increase in load current, derived from the supply 28, through the load resistor 27. A decrease in voltage at the collector of the transistor 7 also appears as a decrease in voltage at the base electrode of the transistor 24 which decreases the current flow therethrough. The decrease in current flow through the transistor 24 raises its collector voltage and produces a further small increase in the voltage at the output electrode 17. This action increases the gain of the transistor emitter follower 7 to approximately 0.98 as opposed to 0.95 in the circuit of Figure 1 and further decreases the output impedance of the circuit. The decrease in conductivity of the transistor 24 which is connected in shunt with the load, effectively decreases the load on the circuit and permits a larger proportion of the current through the series connected transistor 7 to charge the capacitive load.

Upon the application of a negative pulse to the base electrode 1, the voltage at the emitter 4 and therefore the voltage at the emitter 16 of the transistor 7 rapidly decreases. The decrease in voltage on the base 6 of the transistor 7 produces a decrease in collector current of the transistor and raises the voltage at the base of the transistor 24. The rise in voltage at the base 26 increases the current through the transistor 24 and produces a further decrease in voltage at the output terminal 17. The sudden increase in current of the transistor 24, which is in shunt with the load, provides a low impedance path for rapid discharge of the capacitive load connected to the terminal 17.

The resistor 11 and capacitor 12 of Figure 1 may be added to the circuit of Figure 2 as indicated by the dotted line elements, in order to provide a sweep generator of the type illustrated in the prior figure. Of course, either of the circuits of Figure 1 or Figure 2 may be utilized independently of the sawtooth generator elements; that is, resistor 11 and capacitor 12, and employed with externally generated voltages. In the circuit of Figure 2 the battery 29 serves to control the D.C. level of the output signal appearing on the terminal 17 and may be eliminated if desired. However, if the emitter 31 of the transistor 24 were grounded, the emitter 16 of the transistor 7 would be at a relatively large negative voltage with respect to ground which may be undesirable in an amplifier circuit.

Referring now specifically to Figure 3 of the accompanying drawings there is illustrated a bootstrap amplifier circuit of the same type as disclosed in Figure 1, but utilizing tubes in place of transistors. A triode 33 has an anode 34, connected to the positive terminal of an isolated power supply 36 and also connected through a resistor 37 to a control grid 38 of the tube 33. The control grid 38 is connected to ground through a capacitor 39 and a cathode 41 of the tube 33 is connected to ground through a resistor 42. The cathode 41 is also connected to a control grid 43 of a triode 44 having an anode 46 connected to a source of anode potential and having a cathode 47 connected to an output terminal 48. The cathode 47 is also connected to an anode 49 of a pentode amplifier tube 51 having its screen grid 52 connected to ground and a control grid 53 connected to a source of negative potential. The tube 51 further includes a cathode 54 connected through a cathode resistor 56 to the aforesaid source of negative potential. In the schematic diagram of Figure 3 a normally open and selectively closable switch 57 is connected in shunt with the capacitor 39 in order to discharge the capacitor 39 at the end of each sweep cycle, and therefore to produce the flyback of the sawtooth wave.

In operation, the capacitor 39 begins to charge and the increased voltage produced by charging of the capacitor is applied to the control grid 38 of the tube 33 and increases conduction through the tube. The increase of current flow through the tube 33 increases the voltage at the cathode 41 of the tube and this increase in voltage is applied to the grid 43 of the tube 44. The increase in voltage of the grid 43 tends to increase the current through the tube 44 but this is resisted by the constant current operation of the tube 51. However, the conductivity of the tube is increased and the resistance of the tube 44 is reduced so that the voltage on the output terminal 48 increases. The increase in voltage on the output terminal 48 is coupled back through the power supply 36 to the anode of the tube 34 and also to the upper end, as illustrated in Figure 3, of the resistor 37. In consequence of the near unity gain of the cathode follower-connected tubes 33 and 44, the anode 34 of the tube 33 rises in voltage approximately to the same extent as the grid 38 and therefore the input capacity of the tube 33 remains substantially constant. Also, the increase in voltage at the anode 34 increases the voltage at the upper end of the resistor 37 and maintains the current applied to the capacitor 39 constant so that a uniformly increasing voltage is developed across the capacitor to provide the requisite upwardly sloping portion of the sawtooth wave.

Referring now to Figure 4 of the accompanying drawings, there is illustrated a voltage regulator circuit employing the basic circuit arrangement of Figure 2. The circuit elements common to both circuits are designated by the same reference numeral.

The circuit illustrated is a negative voltage supply with the source 29 of Figure 2 eliminated. Further, a voltage divider comprising resistor 58, 59 and 61 or other suitable variable resistance arrangement for deriving a selectable portion of the output voltage is connected between the output terminal 17 and ground. The resistor 59 is provided with a movable tap 62 connected via a lead 63 to one input of a voltage comparing D.C. amplifier 64 supplied with a reference voltage from a reference voltage source 66. The amplifier 64 develops a signal on a lead 67 equal to the difference between the feedback and the reference signals, and the lead 67 is connected to the base electrode 2 of the transistor.

In operation, if the signal on lead 63 equals the reference voltage then no signal is developed on lead 67 and the circuit is stabilized. However, if the signal on lead 63 becomes less negative, the amplifier 64 develops a negative signal on the base 2 of transistor 1 so as to decrease current through the transistor 7, increase current through the transistor 24, and cause the voltage on terminal 17 to become more negative. The converse operation takes place if the voltage on terminal 17 becomes more negative with respect to ground than desired. In this instance, the amplifier 64 develops a positive voltage on lead 67 which increases conduction through transistor 7, decreases conduction through transistor 24, and therefore decreases the negative voltage on terminal 17. Resistors 68 and 69 may be employed to stabilize the circuit against collector leakage or a resistor and low voltage supply may be converted between emitter 16 and base 6 for the same purpose.

It will be noted that in this circuit the transistor 24 decreases its resistance to cause the voltage on terminal 17 to become more negative and increases its resistance to cause the voltage to become less negative. Therefore, in this embodiment of the invention the transistor 24 is the series element and the transistor 7 is the shunt element while the converse is true in the circuit of Figure 2. The differences in functions of the transistors 7 and 24 arise from the fact that in the circuit of Figure 4 the supply 29 has been eliminated and therefore the effects of the transistors 7 and 24 on the value of the output voltage with respect to ground are reversed.

If it is desired to employ the present embodiment of the invention to apply a ramp or other varying voltage to a reactive and primarily a capacitive load, the position of the tap 62 on the resistor 59 may be varied uniformly. The circuit of the invention, as illustrated in Figure 4, is particularly useful in such a system in that the capacitor may be rapidly charged through the series connected transistor 24 and rapidly discharged through the shunt connected transistor 7. Thus, the circuit can maintain the amplitude of a ramp voltage relatively constant in spite of variations in the load.

It will be noted by referring to all of the Figures 1 through 4 that the bootstrap circuit is extremely simple, requiring only the connection of the single power supply between the output terminal and the anode of the input control element, the transistors 1 of Figures 1 and 2, and the triode 33 of Figure 3. Therefore, extreme simplicity is achieved with a minimum of circuit elements.

While I have described and illustrated several embodiments of my invention, it will be clear that variations of the details of construction which are specifically illustrated and described may be resorted to without departing from the true spirit and scope of the invention as defined in the appended claims.

What I claim is:

1. A bootstrap circuit comprising a first, second, and third amplifying elements, each having a control electrode, an output electrode and a third electrode, means providing a direct current connection between said output electrode of said first amplifying element and said control electrode of said second amplifying element, a low capacity power supply, means connecting said output electrode of said second amplifier to said third electrode of said first amplifying element through said power supply, means providing a signal voltage connection between said output electrode of said third amplifying element and said output electrode of said second amplifying element, and means for varying the voltage applied to said control electrode of said third element in accordance with variations in the signal applied to said control electrode of said second amplifying element.

2. The combination according to claim 1 wherein said control electrode of said third amplifier is connected to said third electrode of said second amplifier element.

3. The combination according to claim 1 further comprising a resistor and wherein said control electrode of said third amplifier is connected to a reference potential through said resistor.

4. The combination according to claim 1 wherein said first and second amplifier elements are transistors and said output electrodes are emitter electrodes.

5. The combination according to claim 1 wherein said first and second amplifying elements are triodes and said output electrodes are cathode electrodes.

6. The combination according to claim 2 further comprising means for deriving a feedback voltage equal to a predetermined portion of the voltage at said output electrode of said second amplifying element, means for comparing said feedback voltage with a reference voltage to derive an error signal equal to the difference between said voltages and means for applying said error voltage to said control electrode of said first amplifying element in such a sense as to reduce said error signal.

7. A bootstrap circuit comprising first and second amplifying elements each having a control electrode, an output electrode and a third electrode, means connecting said output electrode of said first amplifying element to said control electrode of said second amplifying element, a low capacity power supply, means connecting said output electrode of said second amplifier to said third electrode of said first amplifying element through said power supply, a resistor connected between said third electrode and said control electrode of said first amplifying element, a capacitor connected between said control electrode of said first amplifying element and a reference potential and means for selectively discharging said capacitor.

8. The combination according to claim 7 further comprising a third amplifying element having a control electrode, an output electrode and a third electrode, means interconnecting said third electrodes of said first and third amplifying elements and said control electrode and said third electrode of said third and second amplifying elements respectively.

9. The combination according to claim 8 wherein said amplifying elements are transistors and said output electrodes are emitter electrodes.

References Cited in the file of this patent

UNITED STATES PATENTS

| | | |
|---|---|---|
| 2,837,663 | Walz | June 3, 1958 |
| 2,891,173 | Helbig | June 16, 1959 |